Figure 1:
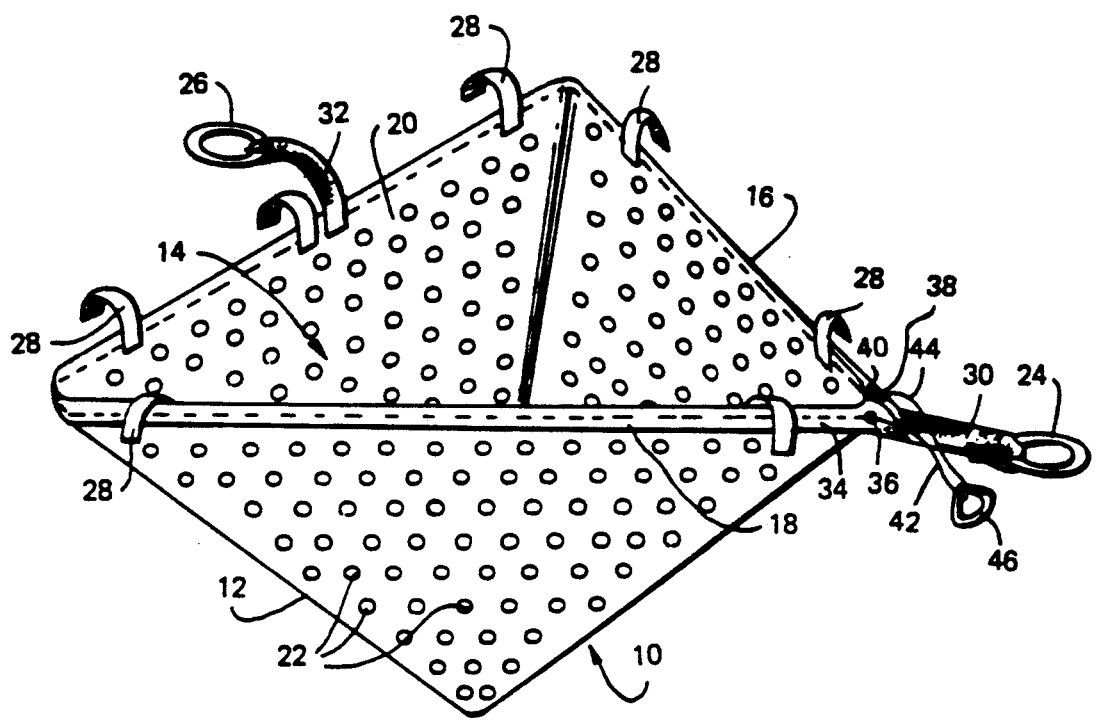

United States Patent [19]

Lumb et al.

[11] Patent Number: 5,276,989
[45] Date of Patent: Jan. 11, 1994

[54] FISH HANDLING NET

[76] Inventors: Derek W. Lumb, 7 Brenden Avenue, Moston, Manchester M10 9JH; Derek J. Flood, 116 Gill Street, Moston, Manchester M9 1FU, both of United Kingdom

[21] Appl. No.: 909,191

[22] Filed: Jul. 6, 1992

[30] Foreign Application Priority Data

Jul. 5, 1991 [GB] United Kingdom ............... 9114548

[51] Int. Cl.$^5$ ............................................. A01K 77/00
[52] U.S. Cl. ............................................. 43/11; 43/7; 210/470; 210/471
[58] Field of Search .............. 43/7, 11; 119/5; 210/470, 471

[56] References Cited

U.S. PATENT DOCUMENTS

| | | | |
|---|---|---|---|
| 404,946 | 6/1889 | Andersson | 43/11 |
| 1,053,573 | 2/1913 | Clemm | 210/470 |
| 1,395,951 | 11/1921 | Ferdon | 210/470 |
| 1,622,800 | 3/1927 | Muinch | 210/471 |
| 1,658,002 | 1/1928 | Masuoka | 210/471 |
| 3,530,610 | 9/1970 | Bremer | 43/11 |
| 4,063,380 | 12/1977 | Grim | 43/11 |
| 4,481,117 | 11/1984 | Collins | 43/11 |
| 4,815,227 | 3/1989 | Flanders | 43/7 |

*Primary Examiner*—Kurt C. Rowan
*Attorney, Agent, or Firm*—Oliff & Berridge

[57] ABSTRACT

A fish handling net comprises a body portion having a triangular opening. The body portion can be formed from a net material or from waterproof plastic sheet material such as PVC which has been perforated to provide drainage holes.

The body portion is provided with attachment means comprising weighing rings, and VELCRO® strips along each side of the body portion. The weighing ring is attachable to a projection of a sleeve which is clamped to a pole.

18 Claims, 3 Drawing Sheets

FISH HANDLING NET

This invention relates to a net for use in conjunction with a fish landing net.

It is common practice for an angler to use a landing net to land a fish once it has been caught. The angler manipulates the rod with one hand and the landing net in the other hand to place the fish in the landing net. The rod and landing net then have to be carried to a suitable place where the rod and landing net can be laid down for the hook to be removed from the fish.

The fish then has to be removed from the landing net and weighed. It may be necessary to take the fish to the weighing scales which could be some distance away particularly when the fish is caught as part of an angling match.

It is also important that the fish is handled as little as possible and is returned to the water with a minimum of delay. It will be appreciated that the present landing method involves considerable handling and can involve lengthy time delays. Also the fish should be kept wet during handling and transit so as to maintain the condition of the fish. The prior art method involves a certain amount of drying out though wet towels and similar means are used in an attempt to keep the fish wet during transit. The present invention seeks to provide a handling net for use in conjunction with a landing net which will reduce or overcome some or all of the disadvantages of the prior art method of landing fish.

Accordingly the present invention provides a fish handling net arranged to be attached to a landing net, the handling net comprising a body portion having drainage openings and attachment means allowing the handling net to be releaseably attached to the landing net with the handling net located internal to of the landing net.

The attachment means can comprise one or more VELCRO® strips secured to the handling net and engagable with the landing net.

In one form of the present invention the handling net comprises the body portion having a triangular opening which corresponds to the triangular opening of the landing net, each edge of the handling net having two VELCRO® strips to attach the handling net to the landing net.

The attachment means can further comprise one or more weighing rings, one of the rings being engagable with a projection in the landing net.

Preferably the two weighing rings are secured to the handling net enabling the handling net to be suspended from weighing scales, although only one of the weighing rings need be secured to the landing net.

The projection on the landing net can comprise an adjustable clip having a clamping screw to secure the clip on the landing net, the clamping screw providing a suitable projection for one of the weighing rings.

The handling net can have a draw string enabling the opening in the body portion of the net to be closed. The draw string can terminate in an eye which can be located on the projection of the landing net if required.

The handling net can be formed from a conventional net material or a plastic sheet material such as a sturdy gauge PVC in which drainage holes have been punched.

Figure 4:
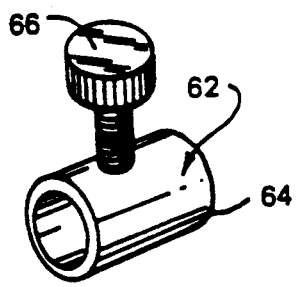
Figure 2:
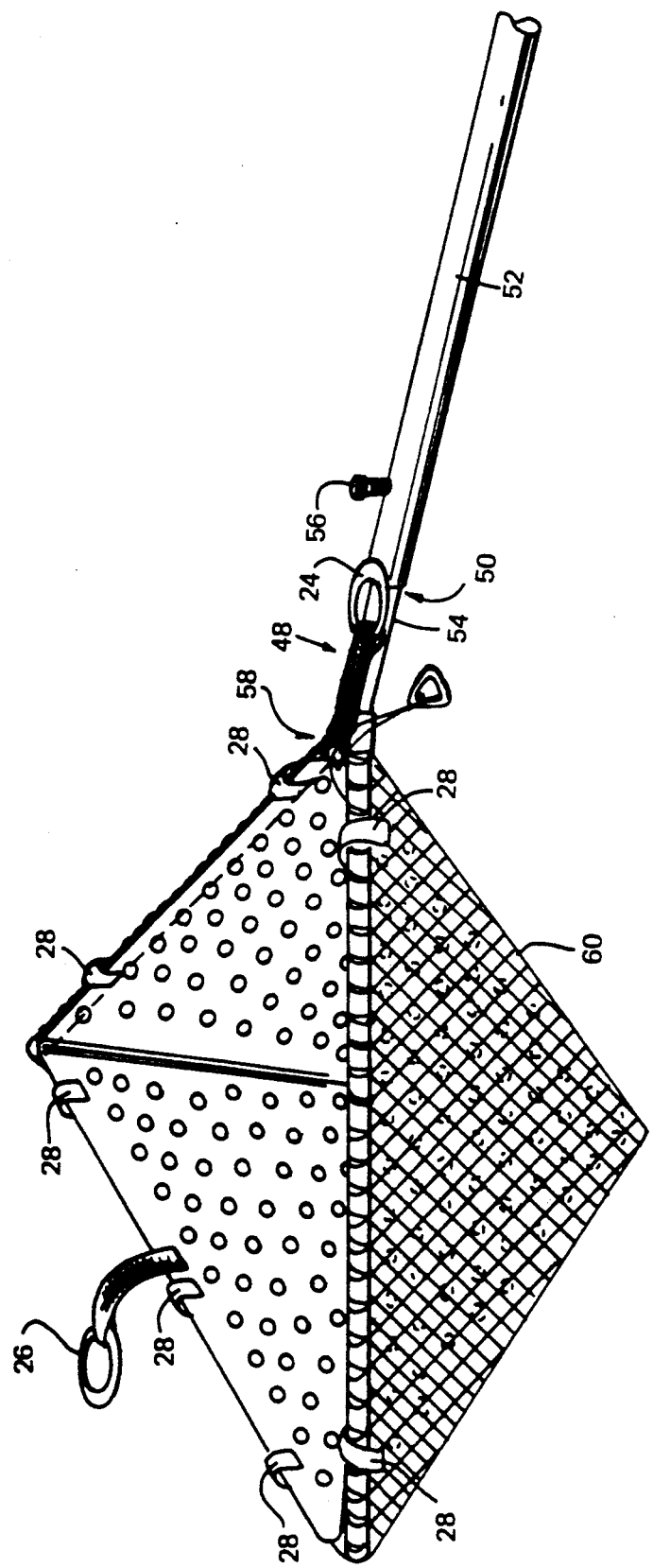
Figure 3:
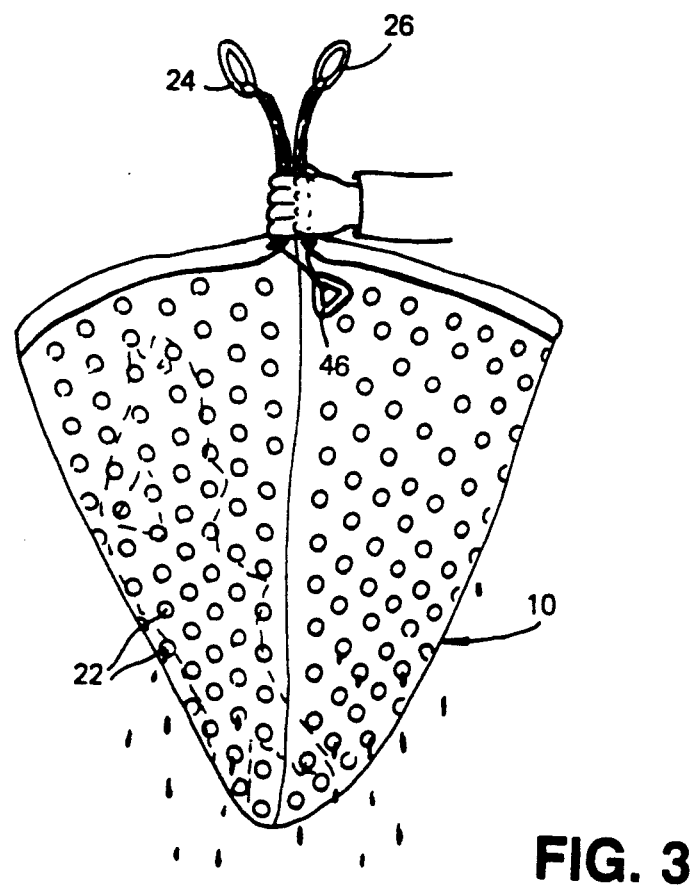
Figure 3:
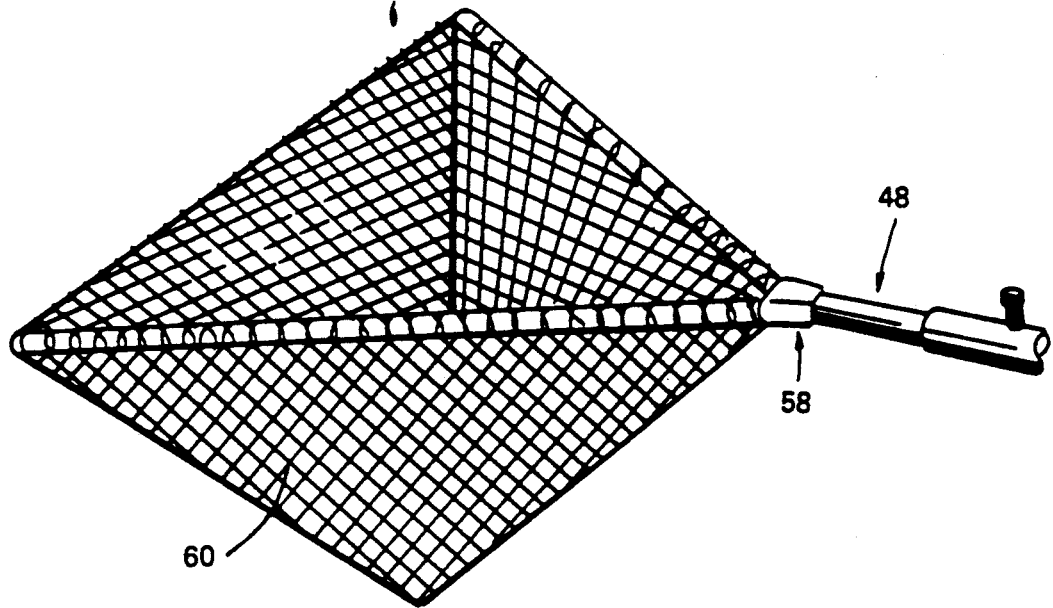

The present invention will now be more particularly described with reference to the accompanying drawings in which FIG. 1 shows a perspective view of one form of fish handling net according to the present invention, FIG. 2 shows the net illustrated in FIG. 1 secured to a landing net, FIG. 3 shows the net illustrated in FIG. 1 being lifted from the landing net, FIG. 4 shows an adjustable clip for use with the handling net illustrated in FIG. 1

Referring to the drawings, a fish handling net (10) comprises a body portion (12) which has a generally triangular opening (14) formed by three sides (16, 18, and 20). The body portion (12) can be formed from a net material or from a waterproof plastic sheet material such as PVC which has been perforated to provide drainage holes. In the preferred embodiment the body portion is made from sturdy guage PVC sheet material in which perforations (22) have been punched.

The body portion (12) is provided with attachment means comprising weighing rings (24 and 26) and VELCRO® strips (28) (two VELCRO® strips being provided along each side (16, 18 and 20) of the body portion (12).

The weighing ring (24) is attached to the body portion (12) at the junction of the side (16 and 18) and the weighing ring (26) is attached to the body portion midway along the edge (20). In both cases the rings are attached to the body portion by means of lengths of flexible material (30 and 32) respectively, e.g., webbing formed of textile materials.

The edge of the body portion forming the sides (16, 18 and 20) is turned over and secured to form a channel (34) having open ends (36 and 38). A drawstring (40) is located in the channel (34) and the free ends (42 and 44) of the drawstring terminate in an eye (46), extend from the open ends of the channel.

Referring particularly to FIG. 2 the fish handling net (10) is secured to a landing net (48) of a known type. The landing net (48) comprises an adjustable length arm (50) which includes a sleeve (52) and a pole (54) adjustably secured within the sleeve (62) by means of a clamp (56). The pole (54) terminates in a fork (58) and a net (60) is attached to the fork, the net (60) having a free edge which extends between the ends of the fork.

The handling net (10) is secured to the landing net by the VELCRO® strips (28) on the sides (16, 18 and 20) on the handling net passing over the corresponding edges of the landing net (60). It will be appreciated that the hook formations on the VELCRO® strips readily attach themselves to the structure of the net (60).

The weighing ring (24) and the eye (46) can be hooked over any suitable projection on the landing net (48). However for the sake of convenience an adjustable clip (62) (FIG. 4) can be clamped to the pole (54) of the landing net. The clip (62) comprises a sleeve (64) and a clamping screw (66) to secure the clip in any appropriate position on the pole (54). The ring (24) and the eye (46) can then be hooked over the screw (66).

In order to use the handling net (10), it is located in and secured to the landing net (48) as illustrated in FIG. 2 and as described above. Usually the landing net and thus the handling net are immersed so that both the landing net and handling net are kept wet.

When a catch has been made, the angler, with the rod in one hand and the landing net (48) together with the handling net (10) in the other, by suitable manipulation places the fish in the handling net (10). The rod and landing net are then placed on the ground enabling the angler to remove the hook from the fish. The rod can then be placed as required. The handling net, complete with the fish in the handling net, can then be lifted by the angler who now has two free hands, allowing water to drain from the handling net (10). The weight of the fish may cause some or all of the strips (28) to become detached from the landing net but the ring (24) attached to the screw (66) will prevent the handling net from becoming detached from the landing net (48). The handling net (10) complete with the fish is removed from the landing net (48) by detaching the ring (24) and if necessary the eye (46) from the screw (66) and lifting the handling net (10) by means of the rings (24 and 26) as shown in FIG. 3. The opening (14) of the handling net (10) is closed by pulling on the drawstring (40) using the eye (46). The fish can then be carried for weighing and is suspended from weighing scales using the rings (24 and 26). After weighing the fish can be released from the handling net by loosening the drawstring (40). The handling net is then re-attached to the landing net (48) ready for the next catch.

It will be appreciated that the use of a handling net according to the present invention has a number of considerable advantages. The fish requires a minimum of handling by human hands and in fact only sufficient for the hook to be removed.

The handling net, complete with the fish can be removed from the landing net by one hand, the other hand holding the loading net. This is achieved by grasping the weighing ring (26) in one hand and with the ring (26) in that hand releasing the ring (28) using the same hand. The handling net is then removeable from the landing net quite easily since any of the securing strips (28) which are still in position are readily released by withdrawal of the handling net.

The handling net with the fish can then be taken for weighing without the need to carry the landing net and rod. This can be a significant advantage if the weighing scales are some distance from the point of landing.

At all times the fish is kept damp since prior to landing the handling net and landing net are immersed in the water being fished.

A further and important advantage is that the time that a fish is out of the water is considerably reduced enabling the fish to be returned to the water in as healthy a state as possible.

We claim:

1. A fish handling net arranged to be attached to a landing net, wherein the handling net comprises:
    a body portion having drainage holes and attachment means allowing the handling net to be releasably attached to the landing net with the handling net located internal to the landing net;
    the attachment means comprises a plurality of weighing rings, at least one of the rings being engageable with a projection on the landing net; and
    the projection on the landing net comprises an adjustable clip having a clamping screw to secure the clip on the landing net, such that the clamping screw provides the projection for one of the weighing rings.

2. A handling net as claimed in claim 1 in which the attachment means comprises a plurality of VELCRO ® strips secured to the handling net and engageable with the landing net.

3. A handling net as claimed in claim 1 comprising a body portion having a triangular opening which corresponds to a triangular opening of the landing net, each edge of the handling net having two VELCRO ® strips to attach the handling net to the landing net.

4. A handling net as claimed in claim 1 in which the weighing rings are secured to the handling net enabling the handling net to be suspended from weighing scales.

5. A handling net as claimed in claim 1 formed from a net material or plastic sheet material in which drainage holes have been formed.

6. A fish handling net arranged to be attached to a landing net, wherein the handling net comprises:
    a body portion having drainage holes and attachment means allowing the handling net to be releasably attached to the landing net with the handling net located internal to the landing net; and
    drawstrings enabling an opening in the body portion of the handling net to be closed.

7. A fish handling net arranged to be attached to a landing net, wherein the handling net comprises:
    a body portion having drainage holes and attachment means allowing the handling net to be releasably attached to the landing net with the handling net located internal to the landing net; and
    drawstrings enabling an opening in the body portion of the handling net to be closed and, wherein the drawstrings can terminate in an eye which can be located on a projection of the landing net.

8. A fish handling net arranged to be attached to a landing net, the handling net comprising:
    a body portion having drainage holes;
    drawstrings enabling an opening in the body portion of the handling net to be closed;
    attachment means allowing the handling net to be releasably attached to the landing net with the handling net located internal to the landing net; and
    removal means enabling the handling net to be removed from the landing net.

9. A handling net as claimed in claim 8 in which the attachment means comprises a plurality of VELCRO ® strips secured to the handling net and engageable with the landing net.

10. A handling net as claimed in claim 8 comprising a body portion having a triangular opening which corresponds to a triangular opening of the landing net, each edge of the handling net having two VELCRO ® strips to attach the handling net to the landing net.

11. A handling net as claimed in claim 8 in which the removal means comprises a plurality of weighing rings, at least one of the rings being engageable with a projection on the landing net.

12. A handling net as claimed in claim 11, in which two weighing rings are secured to the handling net enabling the handling net to be suspended from weighing scales.

13. A handling net as claimed in claim 11, in which the projection on the landing net comprises an adjustable clip having a clamping screw to secure the clip on the landing net, such that the clamping screw provides the projection for one of the weighing rings.

14. A handling net as claimed in claim 8, in which the drawstrings can terminate in an eye which can be located on a projection of the landing net.

15. A handling net as claimed in claim 8 formed from a net material or plastic sheet material in which drainage holes have been formed.

16. A fish handling net arranged to be attached to a landing net, the handling net comprising:
    a body portion having drainage holes;

attachment means allowing the handling net to be releasably attached to the landing net with the handling net located internal to the landing net; and removal means enabling the handling net to be removed from the landing net, the removal means comprises a plurality of weighing rings, at least one of the rings being engageable with a projection on the landing net.

17. A handling net as claimed in claim 16, in which two weighing rings are secured to the handling net enabling the handling net to be suspended from weighing scales.

18. A handling net as claimed in claim 16, in which the projection on the landing net comprises an adjustable clip having a clamping screw to secure the clip on the landing net, such that the clamping screw provides the projection for one of the weighing rings.

* * * * *